(12) United States Patent
Brien et al.

(10) Patent No.: US 6,278,201 B1
(45) Date of Patent: Aug. 21, 2001

(54) POWER SHARING AMONG MULTIPLE POWER SUPPLIES IN A MATERIAL HANDLING SYSTEM

(75) Inventors: Richard M. Brien, Methuen; Mitchell Weiss, Carlisle, both of MA (US)

(73) Assignee: PRI Automation, Inc., Billerica, MA (US)

( * ) Notice: Subject to any disclaimer, the term of this patent is extended or adjusted under 35 U.S.C. 154(b) by 0 days.

(21) Appl. No.: 09/704,263

(22) Filed: Nov. 1, 2000

Related U.S. Application Data (60) Provisional application No. 60/163,029, filed on Nov. 2, 1999.

(51) Int. Cl.[7] .......................................................... H02J 7/34
(52) U.S. Cl. ................................................................ 307/62
(58) Field of Search ................................ 198/526; 280/8; 307/53, 62, 86

(56) References Cited

U.S. PATENT DOCUMENTS 5,366,059 * 11/1994 Demong ................................ 198/303

* cited by examiner

*Primary Examiner*—Shawn Riley
(74) *Attorney, Agent, or Firm*—Weingarten, Schurgin, Gagnebin & Hayes LLP (57) ABSTRACT

An apparatus for providing power to an automated material handling system that includes a track on which a plurality of electrically powered material transport vehicles are mounted comprises a plurality of current-limited power sources each having a power supply lead and a power return lead. The apparatus further includes a power supply distribution network that is configured and arranged to electrically connect the power supply leads of the plurality of power sources together and to couple the current supplied therefrom to the power supply input of at least one of the plurality of material transport vehicles. And further includes a power return network configured and arranged to electrically couple the power return output of at least one of the plurality of material transport vehicles to the interconnected power return leads of the plurality of power sources. As the voltage of one or more of the power sources droops due to a current overload condition, the other interconnected power sources will begin to supply current via the power supply distribution network.

15 Claims, 4 Drawing Sheets

POWER SHARING AMONG MULTIPLE POWER SUPPLIES IN A MATERIAL HANDLING SYSTEM

CROSS REFERENCE TO RELATED APPLICATIONS

This application claims priority under 35 U.S.C. §19(e) to provisional patent application Ser. No. 60/163,029 filed Nov. 2, 1999; the disclosure of which is incorporated by reference.

STATEMENT REGARDING FEDERALLY SPONSORED RESEARCH OR DEVELOPMENT

N/A

BACKGROUND OF THE INVENTION

The present invention relates generally to power sharing among multiple power sources and in particular to power sharing among power sources providing power to a material handling system using a droop sharing method.

Automated materials transport systems (AHMS), are known for moving materials among various work stations of a facility, typically under the control of a central computer. Such systems are employed, for example, in semiconductor fabrication facilities for moving semiconductor wafers to successive work stations. In one type of wafer transport system, a monorail track is routed past the various work stations and a plurality of electrically powered material transport vehicles (MTVs) are mounted on the track and are moveable thereon. The MTV delivers the wafers to a work station for processing and removes the wafers from the work station after the requisite processing operations have been completed. In general, the monorail track is composed of a series of interconnected track sections. This sections may include one or more routing sections that are operative to provide plural paths along the track. In addition, the track may serve as a conduit for the conductors that supply the power to the AMHS.

As discussed above, MTVs are often used in manufacturing and warehouse environments for transporting and manipulating articles of manufacture. Such vehicles are desirable in these environments due to their clean operation and low noise. The MTVs are propelled along the monorail track by an electric motor and are under the control of a central control system. The electric motor and other electrical equipment onboard the MTV may be powered by an onboard energy source such as a battery, ultracapacitor, fuel cell, or fly-wheel. These onboard energy sources receive power periodically from the AMHS power sources either by a direct electrical connection or by an inductive power transfer system. Alternatively, the motor and other electrical equipment onboard the MTV may be powered by an external power source continuously coupled to the MTV. The MTV can receive the electrical power from the AMHS power source via a direct electrical contact system or alternatively, from an inductive power transfer system.

The AMHS power source must be capable of providing sufficient current to power the entire AHMS system under all possible conditions. The AMES system typically includes a one or more power sources, a fleet of electrically powered MTVs and various electrically powered equipment at each of the nodes. In general, a node in an AMHS is a location where a MTV is stopped, loaded, unloaded, or redirected. As such, a node may be a workstation or an intersection of one or more tracks where the vehicle may be redirected. At a work station, power is needed to automatically load or unload the MTV, whether the MTV provides the mechanism or the work station provides the mechanism for the loading or unloading process. A node at the intersection of two or more tracks within the AMHS requires power to redirect the MTV either to a new level of the monorail track using an elevator type mechanism or onto a new track, on the same level, using a turntable type mechanism. Thus, every MTV and every node contribute to the power requirements of the AMHS.

The physical size of the AMHS also contributes to the large power consumption of the system. Often the layout of an AMHS will be in the shape generally of an oval. The oval may also have side loops that intersect the main oval at two or more intersections. The major axis of the main oval may be several hundred feet long to over a thousand feet long. Each of the side loops may be on the order of a few hundred feet long. Work stations are located throughout the AMHS, often with multiple workstations being located on an individual side loop. The layout of the AMHS typically therefore includes nodes and workstations that are physically remote from one another and from a power source. In order to provide power to these nodes, workstations, and MTVs that are physically remote, the AMHS contains long conductor runs. Long conductor runs can result in substantial power lost in the conductors due to the electrical resistance inherent in the conductors. Moreover, voltage provided by a power source will decrease over a long conductor run also due to the electrical resistance inherent in the conductor. This power loss and voltage drop can cause a variety of equipment problems that could negatively impact the efficient working of the AMHSn such as damage to the MTV onboard motors.

A single AMHS power source would therefore need to have a sufficiently large current supply capacity to ensure the ability to provide sufficient current to the entire AMHS system under worst case scenarios. These scenarios could include times when a majority the MTVs are located at the AMHS nodes and workstation locations that are the most physically remote from the single AMHS power source. Thus, the single AMHS power source would have to provide sufficient current not only to power the fleet of MTVs and the equipment contained at each node, but must be able to provide additional current to overcome the resistance losses in the conductors as well. However the AMHS will draw this large current only rarely. Therefore, under most circumstances, the increased size, increased cost, increased amount of heat generated, and the increased complexity of a single large AMHS power source would not be needed. Furthermore, the loss of the single AMHS would constitute a one-point failure mechanism that would disable the entire AMHS.

A prior art solution has been to divide the AMHS into a plurality of individual power zones. Each power zone has a corresponding individual power source that provides power to that zone. Each individual power source must be able to provide sufficient current not only for each of the nodes and the equipment associated with the node, but must also be able to supply the current necessary to power the maximum number of MTVs that may be operating within the node as well. Therefore, larger more costly power sources will still be needed to ensure system operation under this condition, As with the single power supply this leads to an increase in the size, cost, and the amount of heat generated within the system that must be dissipated. Also, the failure of a single power source will disable the entire AMHS. Thus even with the division of the AMHS into individual power zones, a failure of a single power source is a one-point failure mechanism that will disable the entire AMHS.

It would be desirable therefore to provide power to an AMHS using a plurality of remote power sources in a manner in which the failure of a single power source will not disable the entire AMHS and in which the cost, size, and complexity of the power sources is reduced.

BRIEF SUMMARY OF THE INVENTION

A system for sharing power among a plurality of power sources providing power to an automated material handling system includes a plurality of current-limited power sources each of which includes a power supply lead and a power return lead. A power supply distribution network is electrically connected to each power supply lead couples power to one or more material transport vehicles (MTVs) that are mounted on a rail system and moveable thereon. The power supply network may be coupled to the MTVs by a direct electrical connection or by an inductive power transfer system. If a direct electrical connection is utilized, the MTVs are further coupled to the power return network that is electrically connected to each of the power return leads of the plurality of power sources. If an inductive power transfer system is utilized, the primary coils of the inductive power transfer will be coupled to the power return network. As the output voltage of one or more of the power sources droops due to a current overload condition, the other interconnected power sources will begin to supply current via the power supply distribution network. Thus, the system described herein is capable of tolerating the loss of one power source without disabling the entire automated material handling system.

In one aspect of the invention, the power sources may be an alternating current power source. In another aspect the power source may be a direct current power source. In a further aspect of the invention, the power source may be a pulsed direct-current power source.

Additional aspects, features and advantages of the present invention are also described in the following Detailed Description.

BRIEF DESCRIPTION OF THE SEVERAL VIEWS OF THE DRAWING

The invention will be more fully understood by reference to the following Detailed Description of the Invention in conjunction with the drawings of which.

DETAILED DESCRIPTION OF THE INVENTION

A method and system in accordance with the present invention for power sharing among a plurality of individual power sources distributed across an automated material handling system (AMHS) is disclosed. The AMHS typically includes a continuous track on which one or more electrically powered material transport vehicles (MTVs) are mounted. A power supply distribution network that is electrically connected to the power supply leads of each of the plurality of power sources and couples power to the various MTVs and other electrical equipment. A power return network is also electrically coupled to the MTVs and is electrically connected to each of the power return leads of each of the plurality of power sources, thus forming a closed electrical circuit. The power return network can be isolated from the earth ground of the AMHS to prevent ground current loops from forming.

The power sources are typically current-limited power supplies. These power sources typically experience a voltage droop as the current drawn from the power source increases. As will be explained below, as this output voltage droops past a threshold value, other power sources that are electrically connected to the power supply distribution network will begin to provide additional current. The threshold value is a function of the system components and configuration and in particular is a function of the resistances and the configuration of the conductor runs between power sources.

Figure 1A:
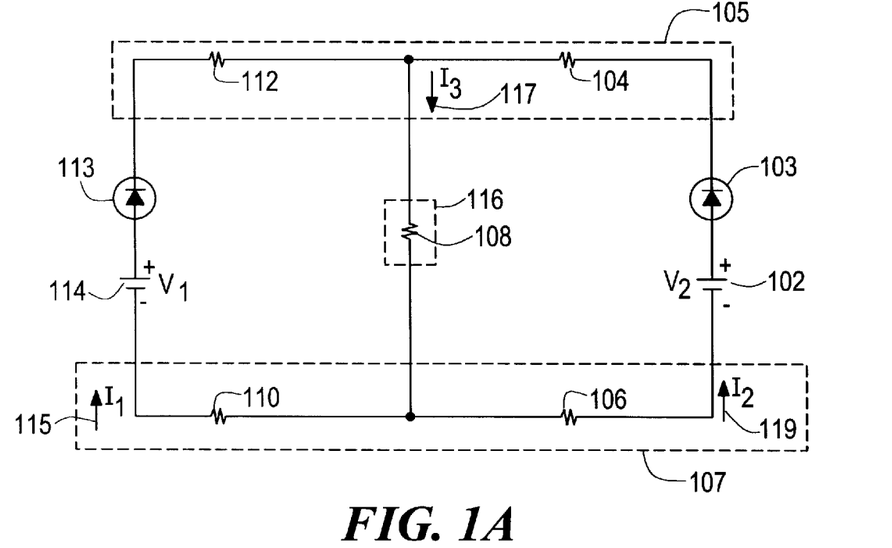
FIG. 1A is a schematic diagram of two power sources interconnected in accordance with the present invention.

FIG. 1A illustrates a schematic diagram of a power sharing system using two power sources in accordance with the present invention. Two power sources are used to illustrate the basic operation of the power sharing system and are not meant to be limiting in any way. Any number of power sources may be used in accordance with the present invention.

A MTV 116 includes an electrical load 108, which may include a motor, a controller circuit, a charging circuit for an onboard energy source, and/or other electrical device(s) that draw(s) electric current. The electrical load 108 is coupled to the first and second power sources 102 and 114 respectively via the power supply distribution network 105 and the power return network 107. The power supply distribution network 105 and the power return network 107 include the conductor resistances 104, 106, 110, and 112 within the two networks. These conductor resistances 104, 106, 110, and 112 are typically a function of the diameter and the length of the conductors used in the respective networks. For example one-hundred feet of 14 gauge cable has a nominal resistance of 0.25 ohms; one-hundred feet of 12 gauge cable has a nominal resistance of 0.16 ohms; and one-hundred feet of 10 gauge cable has a nominal resistance of 0.13 ohms. Other resistances in the power supply and return networks may also be included in the conductor resistances to allow for a more accurate calculation of the system performance. These other resistances may include the internal resistance of the power sources, the forward resistance of any diodes that may be used in the system, the resistance of the electrical connections. If an inductive power transfer system is used, the resistance of the primary coil used to transfer energy to the MTV may also be included.

Combining the line resistances 110 and 112 into a single resistance r', and line resistances 104 and 106 into a single resistance r", setting the load resistance 108 to R, and solving the node equations for the currents 115 and 119, and making a simplifying assumption as to the value of r' yields:

$$I_1 = \frac{(r'' + R)V_1 - RV_2}{r'r'' + R(r' + r'')} \Rightarrow \frac{(V_1 - V_2)}{r''} + \frac{V_1}{R} \text{ if } r' \approx 0 \quad (1)$$

$$I_2 = \frac{(r' + R)V_2 - RV_1}{r'r'' + R(r' + r'')} \Rightarrow \frac{(V_2 - V_1)}{r''} \text{ if } r' \approx 0. \quad (2)$$

Where r'≈0 when the electrical load 108 is proximate to the power source 114 and the values of the resistances 110 and 112 are considerably smaller than the values of the resistances 104 and 106 so as to be negligible in the above calculation. It can be seen from equations (1) and (2) that as the voltage $V_1$ supplied from power source 114 droops there is a decrease in the current supplied by the first power source 114. This decrease in current is offset by the current supplied by the second power source 102. This contribution by the second power source 102 is equal to the difference in voltages between the two power sources divided by the line resistance r". Equations (1) and (2) illustrate that the power sharing network will achieve equilibrium and share currents between the two power sources for any combination of r' and r". It would be obvious to one skilled in the art to scale this illustrative system to include any number of power sources. Thus, a system in accordance with the power sharing system disclosed herein can provide current sharing among a plurality of power sources for an AMHS having an arbitrary configuration of MTVs and nodes.

Table 1 below illustrates the results of one of the power sources drooping output voltage with respect to the current supplied to the load:

TABLE 1

| $V_1$ 114 (Volts) | $V_2$ 102 (Volts) | R 108 (ohms) | r" (ohms) | $I_1$ 115 (amps) | $I_2$ 119 (amps) | $I_3$ 117 (amps) |
|---|---|---|---|---|---|---|
| 43 | 43 | 2 | .02 | 21.5 | 0 | 21.5 |
| 42.9 | 43 | 2 | .02 | 16.45 | 5 | 21.45 |
| 42.75 | 43 | 2 | .02 | 8.875 | 12.5 | 21.375 |
| 42.5743 | 43 | 2 | .02 | 0.000 | 21.287 | 21.287 |
| 42.25 | 43 | 2 | .02 | -16.375 | 37.5 | 21.125 |

As can be seen in Table 1, the first power source 114 stops supplying current when the voltage at power source 114 has drooped to the value of 42.5743 volts. At this value, the voltage division of the second power source across the resistor r" and the load resistor is equal to the drooped output voltage of the first power source 114. As can be seen, the second power source 102 will begin to supply substantially all of the current to the load at this voltage. For drooped output voltages greater than this value, the second power source 102 will not only supply the approximately 21.5 amps to the load, but will also attempt to supply current to the power source 114 as well. To prevent this a pair of blocking diodes 103 and 113 are inserted in series with power sources 102 and 114 respectively to prevent current from flowing back into the power source.

Figure 1B:
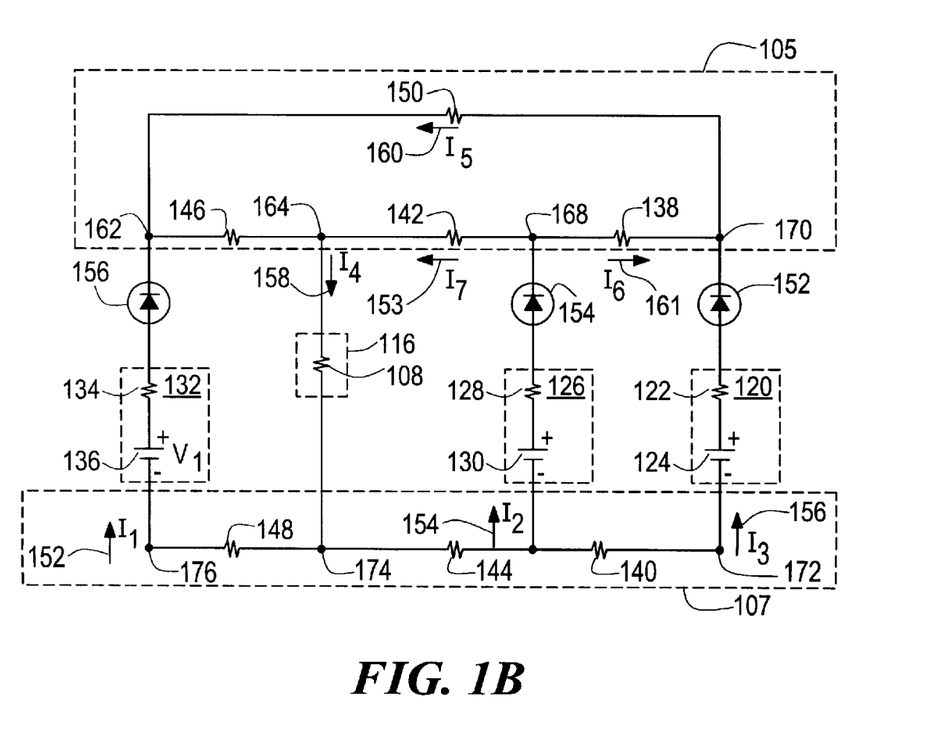
FIG. 1B is a schematic diagram of three power sources interconnected in accordance with the present invention.

FIG. 1B illustrates a power sharing system using three (3), power sources 120, 126, and 132 connected to a load 108 contained within a MTV 116. Each of the power sources includes an internal resistance 122, 128, and 134 corresponding to power sources 120, 126, and 132 respectively. In addition, blocking diodes 152, 154, and 156 are inserted in series with power sources 120, 126, and 132 respectively to prevent back current from flowing into a power source. As discussed above, the power supply distribution network 105 interconnects the power supply leads of each of the power sources and couples electrical power and current to the load. Similarly, the power return leads of the power sources and the electrical load 108 are interconnected via a power return network 107.

Table 2 illustrates the results from a circuit simulation of the circuit depicted in FIG. 1B in which each voltage source 124, 130, and 136 are nominally 43 volts, R 108 is 1 ohms and all line resistances 138, 140, 142, 144, 146, and 148 are 0.01 ohms.

TABLE 2

| Voltage at node 162 | 40.63 Volts |
|---|---|
| Voltage at node 164 | 40.72 Volts |
| Voltage at node 168 | 40.81 Volts |
| Voltage at node 170 | 40.78 Volts |
| Voltage at node 172 | -.1198 Volts |
| Voltage at node 174 | .248 Volts |
| Voltage at node 176 | .092 Volts |
| Current $I_1$ 152 | 15.58 Amps |
| Current $I_2$ 154 | 12.82 Amps |
| Current $I_3$ 156 | 11.98 Amps |
| Current $I_4$ 158 | 40.47 Amps |
| Current $I_5$ 160 | 15.0 Amps |
| Current $I_6$ 161 | 3.02 Amps |
| Current $I_7$ 163 | 9 Amps |

As discussed above, the power sources must be current-limited to protect the power source from damage when a current overload occurs, but the power sources do not have to be voltage regulated. In one embodiment this current-limiting protection may be a circuit breaker or fuse. In other embodiments current limiting circuits or feedback control systems may provide the current-limiting protection. Various methods of current protection are well known in the art.

As illustrated in above the two examples, the loss of voltage at one power source will cause the other power sources connected to the power supply distribution and power return networks to supply the necessary current to the load. Thus, in the situation in which a power source fails entirely the other power sources will provide the current necessary for the AMHS to function. Therefore, power sharing among a plurality of power sources as disclosed herein prevents the failure of a single power source from causing the failure of the entire AMHS. Thus, the power sources of the AMHS no longer represent a single-point failure mechanisms for the AMHS.

In one embodiment, the power sources used may be an alternating current (AC) power source where the amplitude of the voltage may be adjusted by a suitable transformer or other AC voltage setting circuit.

In another embodiment, the power sources used may be a direct-current (DC) power source. The DC power source may include DC power derived from an AC source that has been rectified and filtered as is well known in the art. In another embodiment, the DC power may be provided by a voltage regulated DC power source. In another embodiment, the DC power may include a regulated switching power source. Furthermore, a constant voltage DC power source may be either a non-fold-back type power source or fold-back type power source. If a fold-back power source is used, the power source should reset to the regulated output voltage after an existing current overload situation has ended. This prevents the power source from failing and requiring intervention to reset it. The use of other types of DC power sources would be an obvious modification to the present invention by one skilled in the art.

In another embodiment, the power source may be a pulsed DC power source in which the DC voltage level changes in response to a control signal. The pulsed DC power source may be utilized with either periodic or a periodic pulses.

As discussed above, the fleet of MTVs may contain an onboard energy source such as a battery, ultra-capacitor, fuel cell, or flywheel. This allows an MTV to move along the monorail track using the onboard power source to run an electric motor or other onboard electrical equipment. In this embodiment, the power supply distribution network and power return network provide the power to the electrical equipment located at individual nodes and workstations, and the power distribution network also provides power to a plurality of MTV charging stations. These charging stations allow the MTVs to periodically recharge their onboard energy source(s) by receiving power from the various AMHS power sources. The MTVs can receive power at these charging stations by directly connecting, physically and electrically, to one or more electrical contacts. Alternatively, The MTVs can receive power at these charging stations by an inductive power transfer system in which the MTV receives power via the transformer action of two magnetically coupled coils.

Alternatively, the MTV can rely upon external power continuously coupled to the MTV from the AMHS to provide electrical power for the motor and other electrical equipment onboard the MTV. In this embodiment, the MTV may be directly connected to the power supply distribution network and the power return network. This direct connection couples the power to the MTV and may be a direct electrical and physical connection to an external contact. Such a contact may be provided by a "third-rail" or flexible cabling type system. Alternatively, power may be coupled to the MTV through an inductive power transfer system via two magnetically coupled coils.

The power return network in either of the systems described above is preferably not interconnected to the AMHSA system ground, but rather is connected to a ground that is unique to the power return network. In this way, ground loop currents due to the long conductor runs in the power supply distribution network and power return network can be avoided. These ground loop currents may interfere with the various pieces of electrical equipment within the MTVs or at the nodes. In addition, by preventing the ground loop currents, galvanic corrosion of structure surrounding the AMHS may be avoided.

Figure 2:
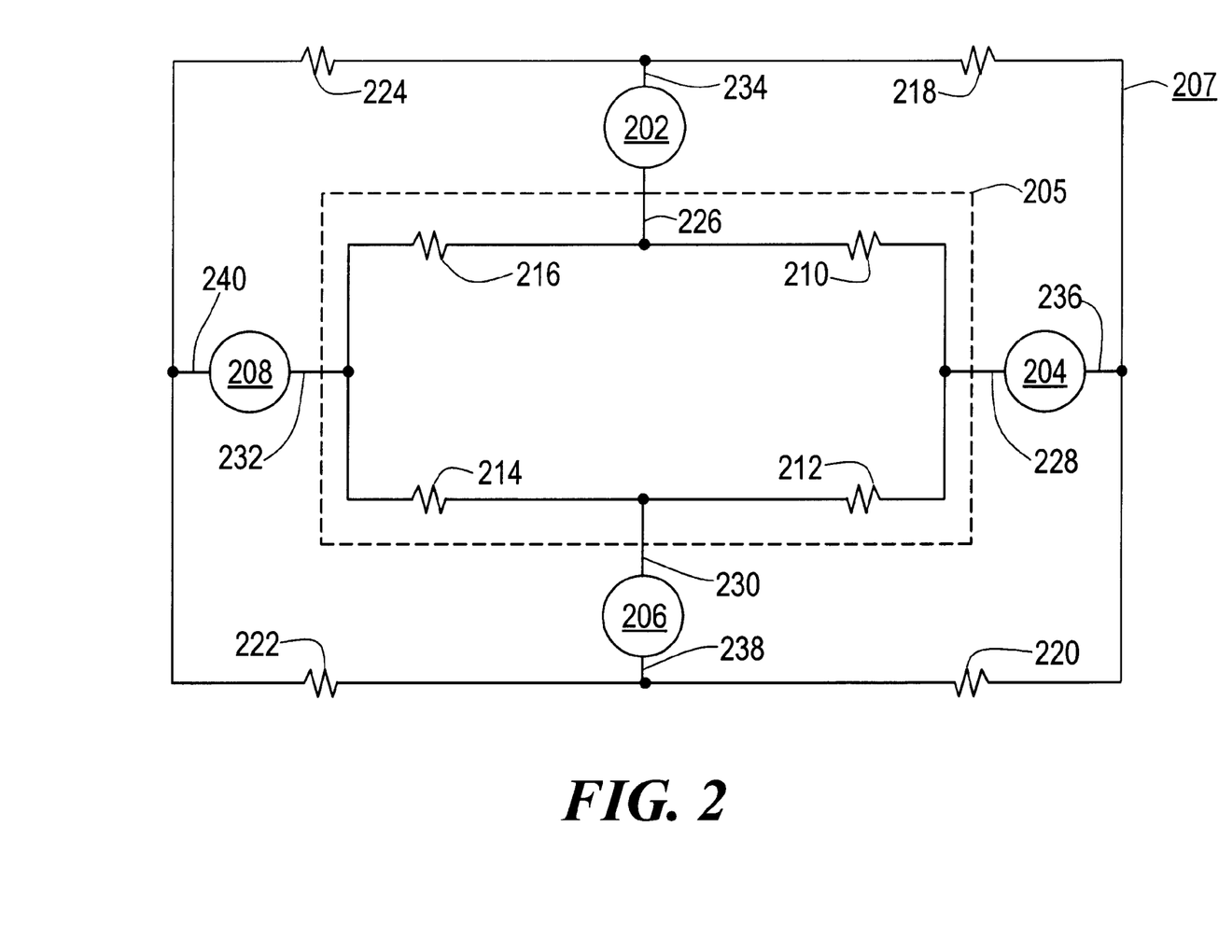
FIG. 2 is a schematic diagram of one embodiment of the interconnection of a plurality of power sources in accordance with the present invention.

FIG. 2 is a schematic illustration of one embodiment of a simplified geometric layout of the power supply distribution network and power return network in accordance with the present invention. In the illustrative example shown in FIG. 2 the geometric layout of the power distribution network and power return network is similar to the simplified oval monorail track that is described above.

In this embodiment, the power supply distribution network 205 and power return network 207 are adjacent to, or contained within the monorail track on which the fleet of MTVs are mounted. In this embodiment, four (4) power sources 202, 204, 206, and 208 that are located at physically remote locations around the AMHS provide the power to the AMHS. Each of the power sources 202, 204, 206, and 208 includes a power supply lead 226, 228, 230, and 232 respectively. These power supply leads 226, 228, 230, and 232 electrically connect to the power supply distribution network 205 at a point that is proximate to the corresponding power source. Line resistances 210, 212, 214, and 216 represent the resistance of the conductors of the power distribution network 205 between each power source coupled thereto. Each power source 202, 204, 206, and 208 also includes a power return lead 234, 236, 238, and 240 respectively, that is electrically connected to the power return network 207. The power return network 207 also includes line resistances 218, 220, 222, and 224 that represent the resistance of the conductors of the power return network 207 coupled to a corresponding power source. In an alternative embodiment, more than one conductor may be used in any path to provide a parallel current path and a concomitant decrease in the line resistance corresponding thereto.

Figure 3:
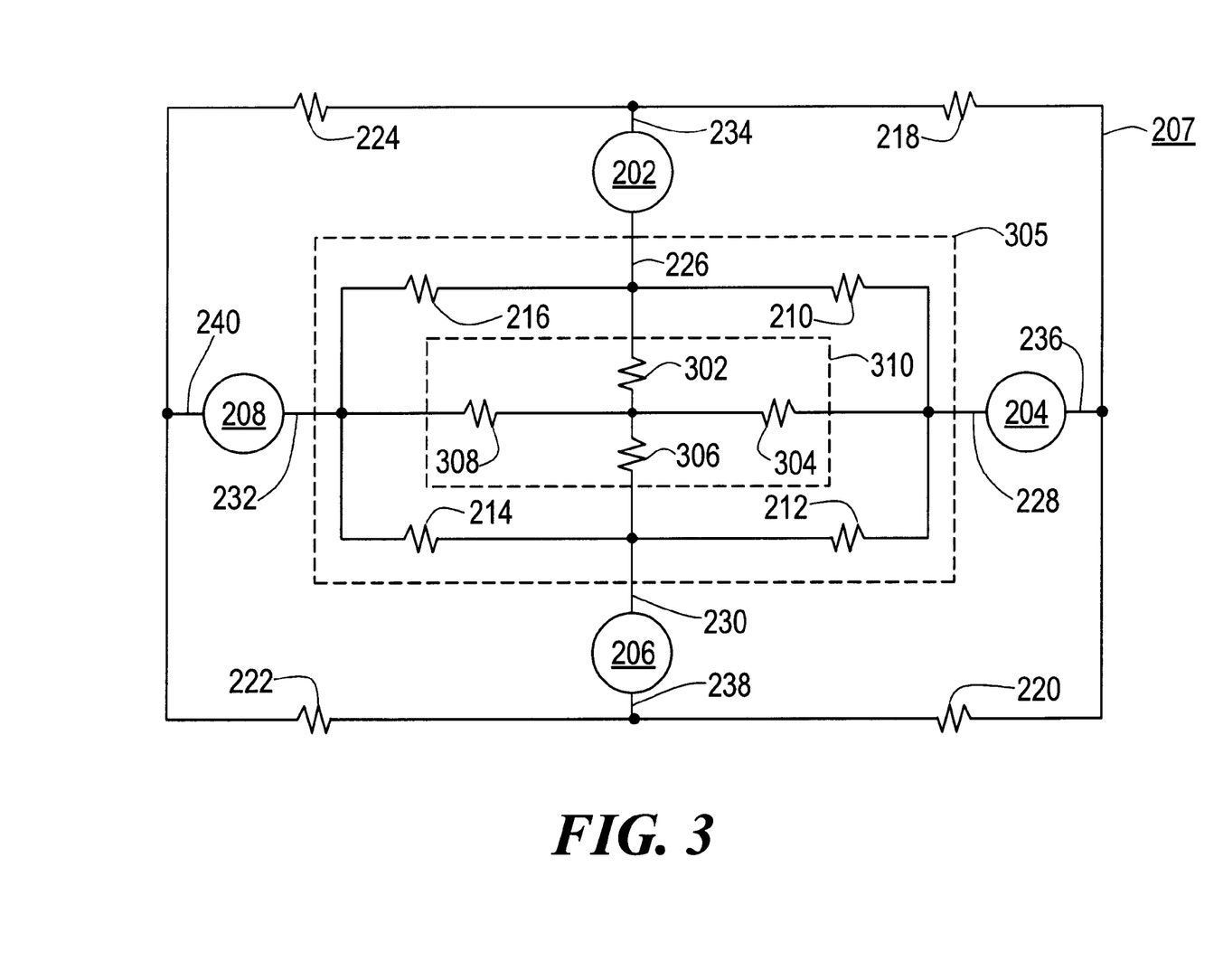
FIG. 3 is a schematic diagram of another embodiment of the interconnection of a plurality of power sources in accordance with the present invention.

FIG. 3 is a schematic illustration of another embodiment of a geometric layout of the power supply distribution network and power return network in accordance with the present invention. In the illustrative example shown in FIG. 3 the geometric layout of the power distribution network 305 and power return network 307 are as shown in FIG. 2. However, in this embodiment a cross coupling of the various power sources is used. The power supply distribution network 305 further includes a cross connection network 310 interconnecting the four power sources. As discussed above in FIG. 2 there are four power sources 202, 204, 206, and 208 that are interconnected by the power supply distribution network 305. The power supply distribution network 305 includes the line resistances 210, 212, 214, and 216 that are the same resistances discussed above with respect to FIG. 2. The power distribution network 305 also includes the line resistances 302, 304, 306, 308 that correspond to the resistances of the interconnecting of the corresponding power sources by the cross connect network 308.

The cross connect network 310 allows the various power sources to share current without being limited to the geometric layout of the track as in FIG. 2. This allows the interconnection of the more remote power sources to the other power sources via shorter conductor runs. Thus, the remote power sources are interconnected with a lower resistance than the layout illustrated in FIG. 2. As such, current sharing among the power sources is more evenly distributed so that the nearest power source will no longer be supplying a larger share of the current. This leads to the use of smaller power supplies due to the decreased current sharing demands on any one power source. The power return network and the various interconnections are the same as described above with reference to FIG. 2.

Figure 4:
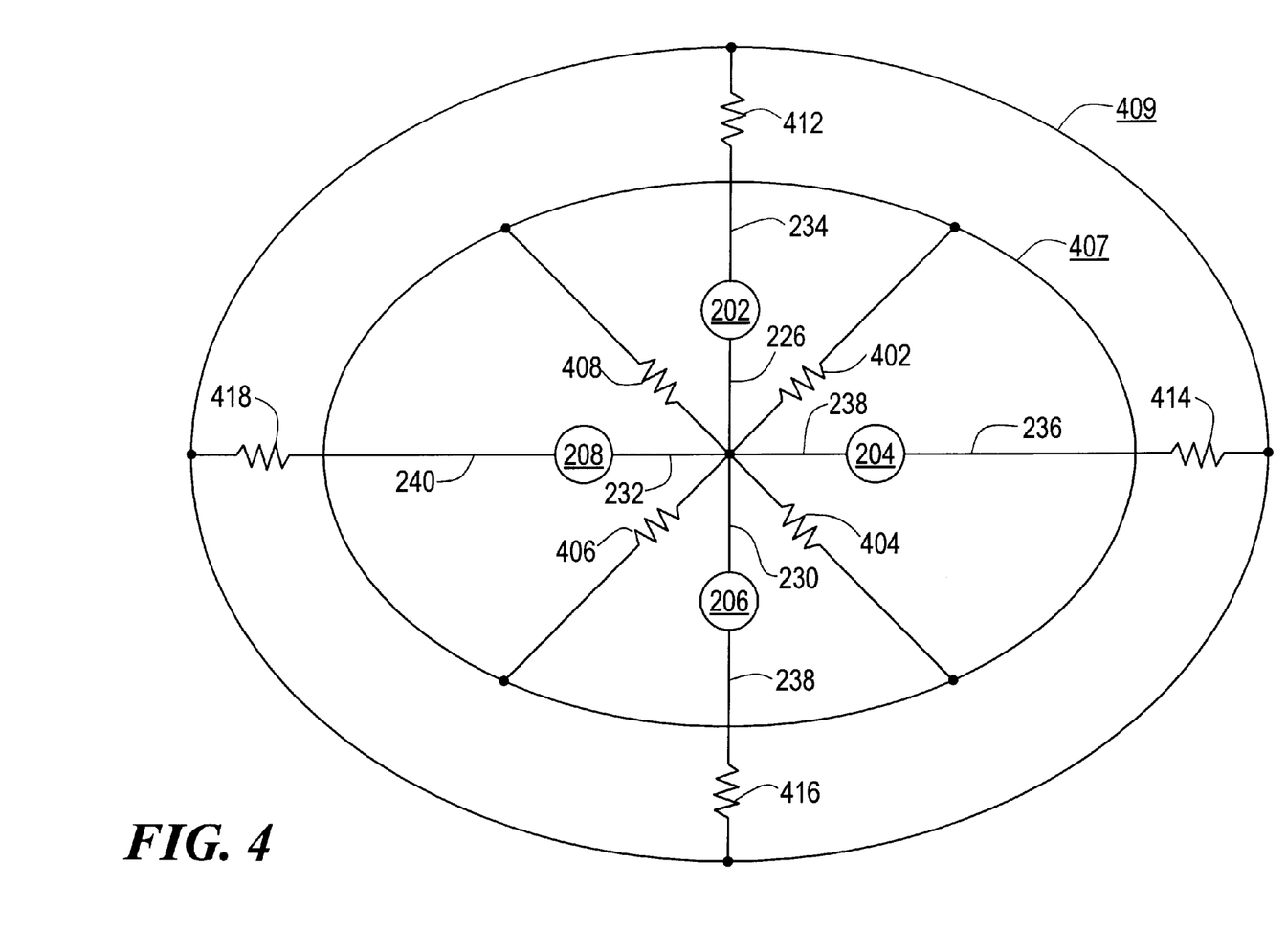
FIG. 4 is a schematic diagram of a further embodiment of the interconnection of a plurality of power sources in accordance with the present invention.

FIG. 4 illustrates another embodiment of a power supply distribution network and power return network in an interior star network in accordance with the present invention. In this embodiment, the four (4) illustrated power sources 202, 204, 206, and 208 are physically proximate and coupled together by their power supply leads 226, 228, 230, and 232 respectively. The power distribution network 407, which as in FIG. 2 is in the same geometric layout as the track on which the MTVs are mounted, is coupled at various points to the interconnected power sources through conductors having line resistances 402, 404, 406, and 408. The four (4) power sources are then coupled to the power return network 409 via conductors having line resistances 412, 414, 416, and 418 as shown.

In the above illustrative embodiments, any modifications to the number of power sources, the number of conductors interconnecting the various power sources, the interconnections between the power source, and different layout geometries would be obvious to one skilled in the art.

Those of ordinary skill in the art should further appreciate that variations to and modification of the above-described apparatus for power sharing among a plurality of power sources may be made without departing from the inventive concepts disclosed herein. Accordingly, the invention should be viewed as limited solely by the scope and spirit of the appended claims.

What is claimed is:

1. An apparatus for providing power to an automated material handling system that includes a plurality of electrically powered material transport vehicles, the apparatus comprising:

a track including a plurality of sections interconnected together in a geometric layout;

a plurality of electrically powered material transport vehicles mounted on the track and moveable thereon, each of the plurality of electrically powered material transport vehicles having a power supply input and a power return output;

a plurality of current-limited power sources each having a power supply lead, a power return lead, and an output voltage;

a power supply distribution network configured and arranged to electrically couple the power supply leads of the plurality of power sources to the power supply input of at least one of the plurality of material transport vehicles, wherein the material transport vehicles receive power to move from the power distribution network; and a power return network configured and arranged to complete the electrical circuit to couple the power to at least one of the plurality of material transport vehicles, wherein as the output voltage of one or more of the plurality of current-limited power sources droops due to a current overload condition, the other power sources connected to the power supply distribution network and the power return network will begin to supply current via the power supply distribution network.

2. The apparatus of claim 1 wherein the plurality of power sources includes a current-limited power sources.

3. The apparatus of claim 2 wherein the plurality of power sources includes alternating-current power source.

4. The apparatus of claim 2 wherein the plurality of power sources includes a direct-current power source.

5. The apparatus of claim 4 wherein the direct-current power source is an alternating current source that has been rectified and filtered.

6. The apparatus of claim 4 wherein the direct-current power source is a constant-voltage output power source.

7. The apparatus of claim 6 wherein the constant-voltage direct-current power source is a fold-back power source.

8. The apparatus of claim 2 wherein the plurality of power sources include a pulsed-direct-current power source.

9. The apparatus of claim 1 wherein the power supply distribution network is configured and arranged in the geometric layout adjacent to the track.

10. The apparatus of claim 1 wherein the power supply distribution network is configured and arranged in a cross-connect configuration.

11. The apparatus of claim 1 wherein the power supply distribution network is configured and arranged in an inside star configuration.

12. The apparatus of claim 1 further including a plurality of diodes, one each of the plurality of diodes inserted in series between the power supply lead of each of the plurality of power sources and the power supply distribution network to prevent current from flowing into the power source.

13. The apparatus of claim 1 wherein the power return network is coupled via a direct electrical connection to the power return output at least one of the plurality of MTVs and to the power supply leads of the plurality of power sources.

14. The apparatus of claim 1 wherein the power supply distribution network electrically couples the power supply leads of the plurality of power sources to the power supply input of at least one of the plurality of material transport vehicles primary coil via an inductive power transfer system.

15. The apparatus of claim 14 wherein the power return network is coupled to a primary coil of an inductive power transfer system.

* * * * *

UNITED STATES PATENT AND TRADEMARK OFFICE
CERTIFICATE OF CORRECTION

PATENT NO.   : 6,278,201 B1                                                    Page 1 of 1
DATED        : August 21, 2001
INVENTOR(S)  : Richard M. Brien et al.

It is certified that error appears in the above-identified patent and that said Letters Patent is hereby corrected as shown below:

Column 1,
Line 61, "AMES" should read -- AMHS --; and

Column 6,
Line 64, "a periodic" should read -- aperiodic --.

Signed and Sealed this

Fifteenth Day of October, 2002

Attest:

Attesting Officer

JAMES E. ROGAN
Director of the United States Patent and Trademark Office